United States Patent [19]

Broszat et al.

[11] Patent Number: 4,580,921

[45] Date of Patent: Apr. 8, 1986

[54] APPARATUS FOR FASTENING A SEALING BELLOWS TO THE HOUSING OF A BALL JOINT

[75] Inventors: Lothar Broszat, Monheim; Franz-Dieter Schnitzler, Hilden; Werner Dickopp, Duisburg, all of Fed. Rep. of Germany

[73] Assignee: TRW Ehrenreich GmbH & Co. KG, Dusseldorf, Fed. Rep. of Germany

[21] Appl. No.: 666,484

[22] Filed: Oct. 30, 1984

[30] Foreign Application Priority Data

Nov. 4, 1983 [DE] Fed. Rep. of Germany ....... 3339874

[51] Int. Cl.⁴ .......................... F16C 11/00; F16D 1/12
[52] U.S. Cl. .............................. 403/134; 277/212 FB
[58] Field of Search ........................... 403/134, 50, 51; 277/212 FB

[56] References Cited

U.S. PATENT DOCUMENTS

| | | |
|---|---|---|
| 2,496,839 | 2/1950 | Abramoska . |
| 2,559,857 | 7/1951 | Edwards . |
| 2,708,591 | 5/1955 | Schiesel . |
| 3,208,290 | 9/1965 | Mathues et al. ................ 403/134 X |
| 3,208,779 | 9/1965 | Sullivan ................................. 403/134 |
| 3,227,478 | 1/1966 | Gottschald ............................. 403/51 |
| 3,284,115 | 11/1966 | Schmidt .................................. 403/51 |
| 3,545,797 | 12/1970 | Korecky . |

FOREIGN PATENT DOCUMENTS

| | | |
|---|---|---|
| 1266573 | 4/1968 | Fed. Rep. of Germany . |
| 1525506 | 1/1970 | Fed. Rep. of Germany ...... 277/212 FB |
| 1373259 | 9/1963 | France . |
| 1000620 | 8/1965 | United Kingdom ................ 403/134 |
| 1181900 | 2/1970 | United Kingdom . |

Primary Examiner—Andrew V. Kundrat
Attorney, Agent, or Firm—Yount & Tarolli

[57] ABSTRACT

In fastening a sealing bellows to the housing of a ball joint, the sealing bellows has a doughnut-form rim which seats in a circumferential ring groove, open in the axial direction and designed U-shaped in cross section, on the outer rim of the housing. The ring groove is formed in part by a circumferential recess, L-shaped in cross section, on the housing rim, and by an L-shaped holding ring, opposite in cross section to the recess and fastened into this latter. To simplify this fastening and to protect the fixing of the sealing bellows, the flat bottom of the opening has a circumferential ring step lying radially inward, and the fastening of the holding ring by its ring flange to the ring step against the radially extending surface of the recess, is made by means of a circumferential projection or several segment-like projections staked from the ring step.

3 Claims, 4 Drawing Figures

APPARATUS FOR FASTENING A SEALING BELLOWS TO THE HOUSING OF A BALL JOINT

BACKGROUND OF THE INVENTION

The subject of the invention is an apparatus for fastening a sealing bellows to the housing of a ball joint, in which the sealing bellows has a doughnut form rim which seats in a circular groove, open in the axial direction, which is generally U-shaped in cross section, and runs around the outer rim of the housing. The circular groove is formed in part by the housing rim generally L-shaped in cross section, and in part by an L-shaped holding ring which is set into the recess defined by the L-shaped housing rim. The cylindrical outer wall of the holding ring for holding the bellows rim is curved radially inward.

From German Published Application 1,266,573, there is known a means of fastening a sealing bellows to the housing of ball joints movable in all directions, in which the sealing bellows has a rim which seats in an axially open groove of the joint housing, the outer wall of which can be rolled in against the sealing bellows. Here, the circular groove is to be formed in the production of the joint housing, and is not to be finished. In practice, however, it has been found that the rolling in of the freestanding side wall of groove against the rim of the sealing bellows is extremely difficult if damage to the sealing bellows is to be prevented.

From U.S. Pat. No. 2,496,839 there is known a means for fastening a sealing bellows to the housing of a ball joint, in which a groove opening is formed by the housing rim, L-shaped in cross section, and defining a circular recess on the one hand; and by an L-shaped holding ring, set into the recess and fastened into it, opposite in cross section to the opening, on the other hand. The holding ring may be fastened to the joint housing by welding, for example.

Starting from this, the invention attacks the problem of simplifying the known fastening of a sealing bellows to the housing of a ball joint with a turned-over holding ring.

SUMMARY OF THE INVENTION

For the solution of this problem, it is proposed that in the axially extending surface of the housing rim there be provided a circumferential ring step lying radially inward, and that the holding ring be fastened or held to lie by its ring flange against this ring step and against the radially extending surface of the housing rim, by means of a circumferential projection or several segment-like projections, staked from the ring step.

In a fastening produced by this process, it is also not necessary to finish, by cutting, the opening at the free end of the joint housing. The placing of the holding ring against the ring step is very simple and can be done in a single work step. After that, the holding ring, together with the side wall of the opening, forms a circumferential ring groove, U-shaped in cross section, for receiving the sealing bellows. Since the holding ring can be produced from a relatively soft metal, and has a rim turned outwardly, there is no danger of damaging the sealing bellows when flanging the holding ring.

BRIEF DESCRIPTION OF THE DRAWINGS

One example of execution of this fastening will be described below with reference to the respective drawings, in which.

DETAILED DESCRIPTION OF A PREFERRED EMBODIMENT

Figure 1:
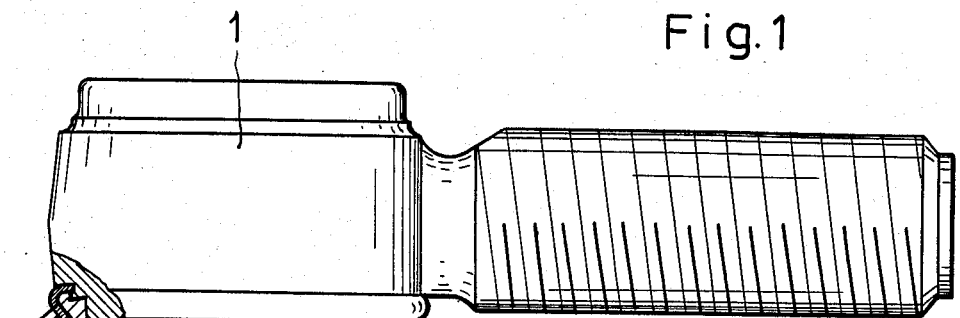
FIG. 1 shows a ball joint, partly in section, in side view.
Figure 2:
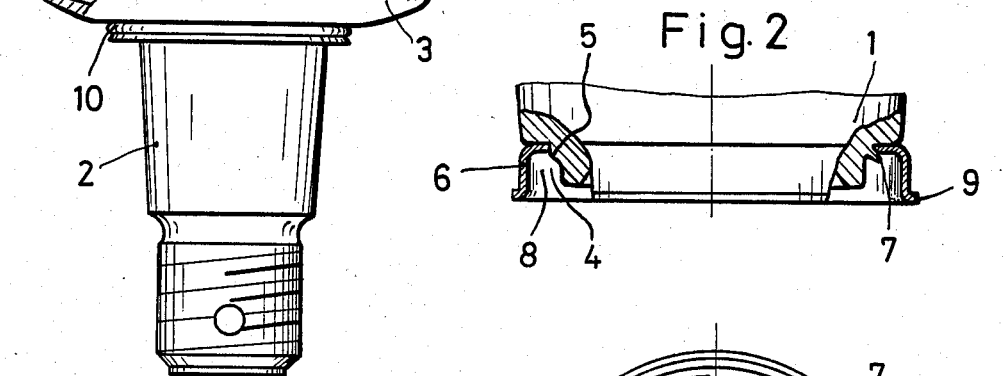
FIG. 2 shows the lower end of the joint housing with a holding ring set on loosely (left half) and staked on (right half), in side view.
Figure 3:
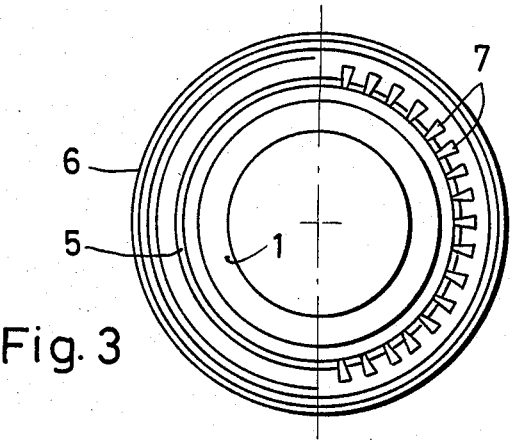
FIG. 3 shows the joint housing with the holding ring loosely set on (left half) and staked on (right half), in a view from below.

The ball joint represented consists of a joint housing 1 with a ball pin 2 arranged therein and a sealing bellows 3, which is fastened by its ends both to the joint housing 1 and to the ball pin 2.

The lower rim of the joint housing 1 has a circumferential recess 4 with a ring step 5 which is surrounded by a holding ring 6. The ring step 5 can be staked about its circumference, so that segment-form projections 7 fix the holding ring 6 to the joint housing 1.

Figure 4:
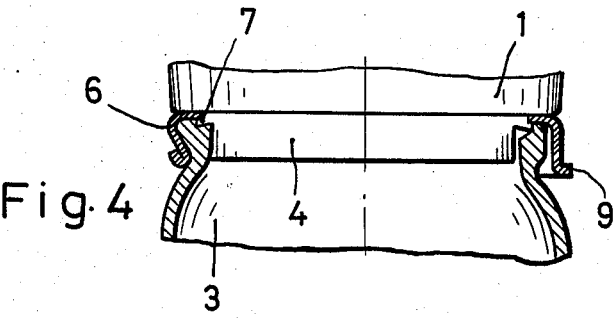
FIG. 4 shows the lower end of the joint housing with a sealing bellows, loosely laid on (right half) and turned inward (left half) in side view.

The housing-side rim of the sealing bellows 3 seats in a ring groove 8 between the joint housing 1 and the holding ring 6, and the bellows 3 is fastened into the latter by flanging the holding ring 6, as represented in FIG. 4 (left half).

So that the holding ring 6, when it is flanged over, does not damage the sealing bellows 3, it has at its free end a rim 9, angled outward, which lies by a radius against the sealing bellows 3 after the flanging of the holding ring 6.

The sealing bellows 3 is fastened to the ball pin 2 by a tension (clamping) ring 10.

What is claimed is:

1. A ball joint comprising a housing defining a chamber, a ball stud having a ball portion received in said chamber and a shank portion projecting from said housing, a sealing bellows encircling the ball stud, and a generally L-shaped holding ring for sealing said sealing bellows against said housing, said sealing bellows having a doughnut-form rim sealing against a rim of said housing, said housing rim comprising a generally L-shaped circular portion having an axially extending surface and a radially extending surface defining a recess extending circumferentially of the housing, said generally L-shaped holding ring being positioned in said recess and fastened therein to define with said generally L-shaped circular portion of said housing rim a generally U-shaped circular groove formed around the axis of said ball stud in which groove said doughnut-form rim of said sealing bellows is located, said generally L-shaped holding ring having a wall extending axially for holding said doughnut-form rim of said bellows, said axially extending surface of said generally L-shaped circular portion of said housing rim having a circumferential ring step lying radially inward of said axially extending wall of said generally L-shaped holding ring, said circumferential ring step having at least one projection extending therefrom radially outwardly thereof for securing the radially extending wall of said generally L-shaped holding ring to the radially extending surface of said generally L-shaped circular portion of said housing rim to thereby fasten said generally L-shaped holding ring to said housing.

2. A ball joint as set forth in claim 1 wherein said ring step has a plurality of projections extending therefrom radially outwardly thereof for engaging said generally L-shaped holding ring.

3. A ball joint as set forth in claim 1 wherein said axially extending cylindrical wall of said L-shaped holding ring also extends radially inward, and is bent radially outward at its end remote from the radially extending surface thereof.

* * * * *